Dec. 10, 1935.    F. W. GODSEY, JR    2,023,522
ELECTROLYTIC DEVICE
Filed Feb. 4, 1935
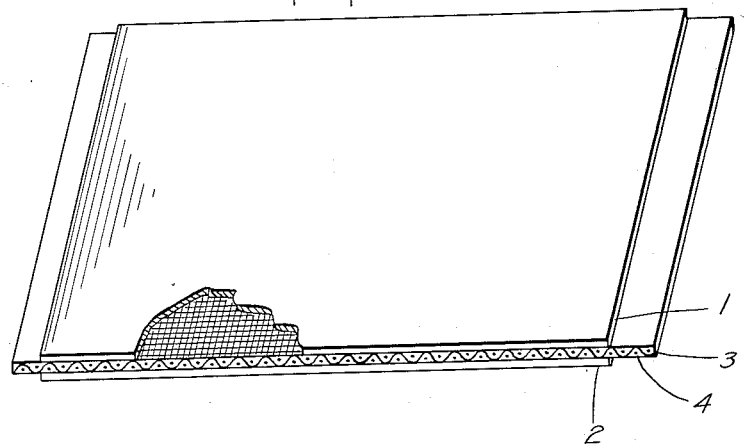
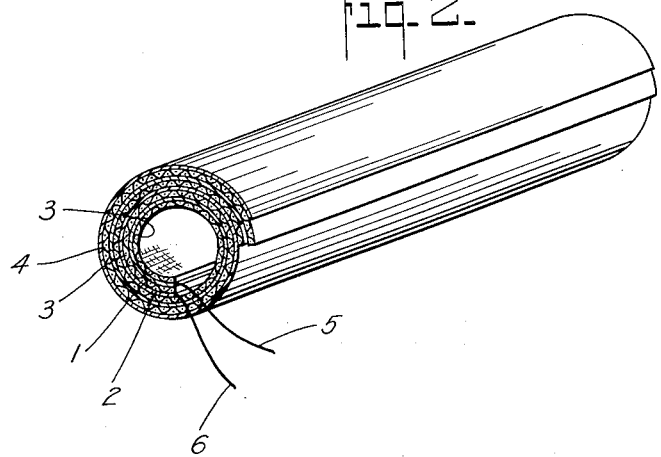
INVENTOR.
FRANK W. GODSEY JR.
BY Dorsey & Cole
ATTORNEYS Patented Dec. 10, 1935

2,023,522

UNITED STATES PATENT OFFICE 2,023,522

ELECTROLYTIC DEVICE

Frank W. Godsey, Jr., North Adams, Mass., assignor to Sprague Specialties Co., North Adams, Mass., a corporation of Massachusetts Application February 4, 1935, Serial No. 4,969

18 Claims. (Cl. 175—315)

The present invention relates to novel electrolytes for electrolytic condensers, and to electrolytic condensers comprising such electrolytes.

The electrolytes of the invention are especially useful for electrolytic condensers having low fluidity or pasty electrolytes, which condensers are generally referred to as "dry" electrolytic condensers, and I shall describe the invention in connection with such condensers; but it should be well understood that my invention is not limited to such condensers.

In the past the electrolytes of "dry" condensers usually comprised as major constituents an ionogen which as a rule was a weak acid, for instance boric acid, phosphoric acid, etc., to which was preferably added the salt of a weak acid of the same type. The electrolyte furthermore comprised a viscous ionizing solvent, usually a polyhydric alcohol, as glycerine, ethylene glycol, etc., with a small amount of water. The viscosity of the electrolyte was frequently further increased by the addition of certain substances, as silica gel, boric acid, etc.

In contradistinction to the above type of electrolytes, my novel electrolytes comprise as major constituent a substance which provides both the weak acid ionogen, as well as the viscous ionizing solvent of the electrolyte.

I have found that certain substances, more particularly the acids derived by oxidation of sugars, especially those derived from the complex sugars classified as aldohexoses, which have the general formula $OH.CH_2(CH.OH)_4CH:O$, possess the unusual property of acting as a weakly acidic ionogen, as well as the viscous ionizing solvent of electrolytes highly suitable for such condensers. Of these acids, gluconic acid has given especially good results, and because of its comparatively low price I prefer to use the same. However, other acids of this class, for instance, mannonic acid, gulonic acid, etc., act in a similar way, although the price of these latter materials is yet so high as to limit their application to special uses. Such acids can be obtained from aldohexoses by their fermentation, by enzyme action, or by bacteriological processes, as is well known by those skilled in organic chemistry.

While in the further description and examples I shall specifically refer to gluconic acid, it should be well understood that the other acids formed of aldohexoses behave in very similar manner, and that my invention broadly covers the same.

The range of the electrolytes which I have found to give the best results comprise, by weight, between 40% to 90% gluconic acid, 5% to 50% of a salt of a weak acid, for instance, of an ammonium, alkali, or earth metal salt of boric acid, phosphoric acid, tartaric acid, malic acid, etc., and 5% to 30% of water. Altogether the water content in some cases may be within considerably wider limits.

In some cases, to reduce the resistance of the electrolyte, I add to the electrolyte a finely divided conductive substance, for example, graphite or pulverized copper.

Especially good results are obtained by using ammonium salts. For example, very good electrolytes are those comprising ammonium gluconate obtained by the addition of ammonia comprising gluconic acid. Such electrolytes should have 15% to 30% of ammonium gluconate and 45% to 80% gluconic acid and 5% to 25% water, and give excellent results.

The electrolyte is prepared by mixing the ingredients, whereby the gluconic acid goes into the mixture either in the form of a crystalline powder or as an aqueous solution. As a rule I prepare a mixture which is more liquid than is the final electrolyte, comprising about twice the amount of water as is desired to have in the electrolyte. The excess of water is then removed by evaporation, preferably by boiling the mixture at a temperature of about 110° C. at atmospheric pressure; or at lower or higher temperatures at correspondingly lower or higher pressure.

With the electrolytes of the invention, condensers adapted for any voltage up to 600 volts and higher can be made, for use in circuits carrying either rectified current or alternating current.

The condensers using such electrolytes have various advantages both with regard to manufacture and characteristics. The combining of the acidic ionogen and viscous solvent component of the electrolyte, the use of lower temperatures in preparing the electrolyte, the absence of volatile ingredients and decreased susceptibility to hydrolysis, reduce the cost of manufacture and avoid undesired secondary chemical reactions. The condensers using such electrolytes are specially characterized by a very high uniformity of their characteristics and by high stability in maintaining them.

In the accompanying drawing forming part of the specification,

Figure 1 is a schematic perspective view of a condenser element embodying my invention;

Fig. 2 is a perspective view of a condenser roll embodying my invention.

The manufacture of these condensers, except for the preparation of the electrolyte, can take place by any one of the well-known methods used in the manufacture of dry electrolytic condensers. Preferably the filming electrode or filming electrodes (in case both of the electrodes are to be filmed) of aluminum or other suitable filming metals, are subjected to film formation before the assembly of the condenser; such formation may take place, for example, by the methods described in the copending applications Ser. No. 548,770, filed July 1, 1931, and Ser. No. 716,714, filed March 21, 1934, of Preston Robinson, the formation taking place preferably in an aqueous solution of a weak acid, for example boric acid, to which a salt of a weak acid may be added.

The electrode foils 1 and 2 are assembled into an assembly—which may be a roll or a stack—preferably with the interposition of a spacer, for example of gauze, cellophane, or paper, or a combination thereof, the spacer also serving as a carrier for the electrolyte. In certain types of condensers the spacer, however, may be dispensed with.

The spacer can be provided with the electrolyte prior to its assembly into the condenser assembly, for instance by soaking the spacer in the electrolyte, or by coating the spacer with the electrolyte, depending upon its viscosity.

Again, it is possible to assemble the electrode foils together with an unimpregnated spacer and impregnate the condenser assembly, preferably by a centripetal impregnating process, as described in application Ser. No. 754,668, filed Nov. 24, 1934, of Preston Robinson and Joseph L. Collins.

The condenser foils are provided with terminal leads 5 and 6, which may also form integral parts of the foils. As a rule the condenser assembly is then surrounded with a wrapper or placed in a container in known manner.

While I have described my invention on hand of specific examples, I do not wish to be limited thereto, but desire the appended claims to be construed as broadly as permissible in view of the prior art.

What I claim is:

1. A viscous electrolyte for electrolytic condensers, comprising a substance which acts both as a weak acid and as a viscous ionizing solvent of the electrolyte.

2. A viscous electrolyte for electrolytic condensers, comprising a substance obtained by the oxidation of a sugar, which substance acts both as a weak acid and as a viscous ionizing solvent of the electrolyte.

3. An electrolyte for electrolytic condensers, comprising as a major constituent an acid derived from an aldohexose.

4. An electrolyte for electrolytic condensers, comprising as a major constituent gluconic acid.

5. An electrolyte for electrolytic condensers, comprising as a major constituent mannonic acid.

6. An electrolyte for electrolytic condensers, comprising as a major constituent gulonic acid.

7. An electrolytic condenser comprising a filmed electrode, and an electrolyte having as a major constituent an acid derived from an aldohexose.

8. An electrolytic condenser comprising a filmed electrode, and an electrolyte having as a major constituent gluconic acid.

9. An electrolytic condenser comprising a filmed electrode, and an electrolyte having as a major constituent mannonic acid.

10. An electrolytic condenser comprising a filmed electrode, and an electrolyte having as a major constituent gulonic acid.

11. An electrolytic condenser comprising a filmed electrode and an electrolyte having as constituents 40% to 90% of an acid derived from an aldohexose, 5% to 50% of a salt of a weak acid, and 5% to 30% water.

12. An electrolytic condenser comprising a filmed electrode, and an electrolyte having as constituents 40% to 90% of gluconic acid, 5% to 50% of a salt of a weak acid, and 5% to 30% of water.

13. An electrolytic condenser comprising a filmed electrode, an electrolyte having as constituents 40% to 90% of mannonic acid, 5% to 50% of a salt of a weak acid, and 5% to 30% of water.

14. An electrolytic condenser comprising a filmed electrode, an electrolyte having as constituents 40% to 90% of gulonic acid, 5% to 50% of a salt of a weak acid, and 5% to 30% of water.

15. An electrolytic condenser comprising a filmed electrode and another electrode, an absorbent spacer, and a viscous electrolyte, said viscous electrolyte comprising as a major constituent gluconic acid.

16. An electrolytic condenser comprising a filmed electrode and an electrolyte comprising an ammonium salt and gluconic acid.

17. An electrolytic condenser comprising a filmed electrode and an electrolyte which comprises 15% to 30% ammonium gluconate, 60% to 90% gluconic acid, and 5% to 25% water.

18. In the process of preparing an electrolyte for dry condensers, the process which comprises, mixing gluconic acid with a salt of a weak acid and with water, and heating the electrolyte to about 110° C. to remove about one-half of the water originally present in the electrolyte.

FRANK W. GODSEY, Jr.